INVENTOR
Willi Warmer

By Tourover and Browdy
Attorneys

INVENTOR
Willi Warmer
By Touroven and Browdy
Attorneys

Oct. 25, 1966    W. WARMER    3,280,999
CLOSURE ARRANGEMENT FOR GLASSWARE
Filed June 25, 1965    5 Sheets-Sheet 4
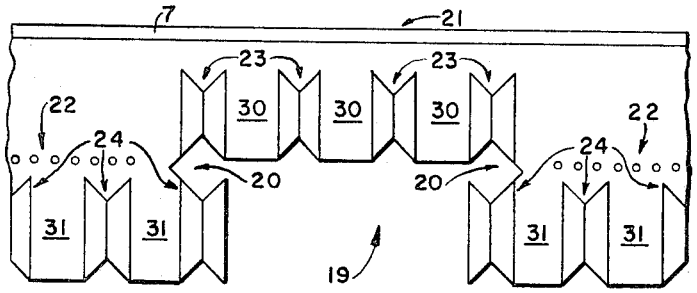
FIG. 5.
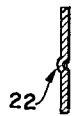
FIG. 5a.
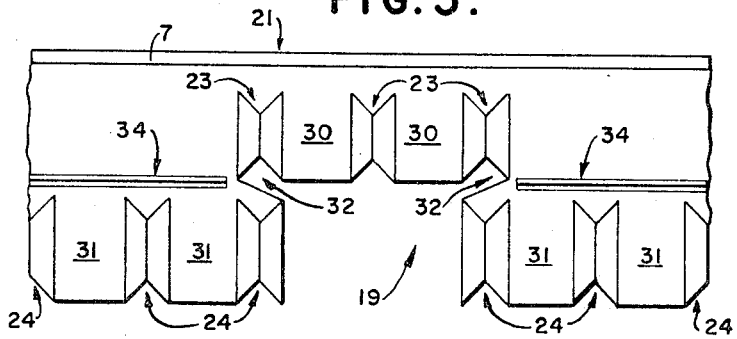
FIG. 8.
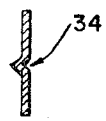
FIG. 8a.
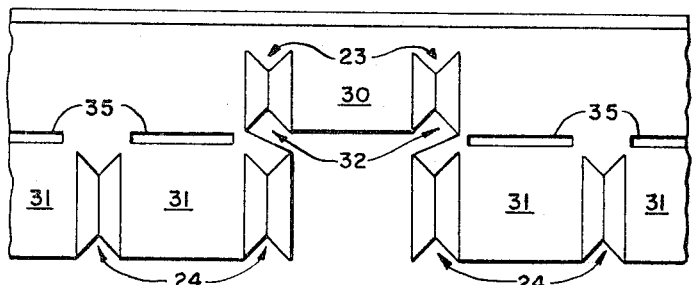
FIG. 9.
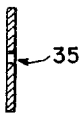
FIG. 9a.
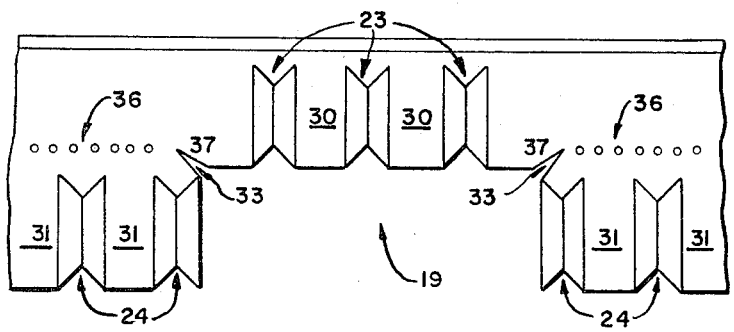
FIG. 10.
FIG. 10a.
INVENTOR
Willi Warmer
BY Tourove and Browdy
ATTORNEYS INVENTOR
Willi Warmer BY Tourove and Browdy
ATTORNEYS United States Patent Office 3,280,999
Patented Oct. 25, 1966

3,280,999
CLOSURE ARRANGEMENT FOR GLASSWARE
Willi Warmer, Karnaper Strasse 66,
Essen-Karnap, Germany
Filed June 25, 1965, Ser. No. 467,052
Claims priority, application Germany, Jan. 30, 1963,
St 20,237
20 Claims. (Cl. 215—39)

The present application is a continuation-in-part of patent application, Serial No. 340,647, filed January 28, 1964, and now abandoned, in the name of the present applicant.

The invention relates to a closure arrangement for glass articles, such as bottles, glass packages etc., in which a cap engages over a lip of of the mouth of the article and is retained thereon by flanging or the like.

Known closures of this kind, which are conventionally known as crown corks, have proved satisfactory in many cases, but they have the disadvantage that the closure caps cannot be used for re-closing the bottles etc.

There has therefore been no lack of proposals to obviate this disadvantage. For example, it has been proposed to place plastic inserts in the cap, such inserts being removed from the cap and placed over the mouth for re-closing the bottle or the like.

Starting from this prior art, the invention has as its object to provide a closure arrangement simple to manufacture and fit and which can be re-used when the contents have been partially emptied, while in addition a considerable saving of material and a satisfactory construction are obtained by an appropriate design for the mouth, in conjunction with reduced susceptibility to damage during manufacture.

To this end, according to the invention, the mouth of the glass article is provided with a top and a bottom lip against which the closure cap is so made to bear after the filled glass article has been closed that the top and bottom lips of the mouth each give a closure step.

The cap is advantageously retained by a press fit at the bottom lip of the mouth and by a snug fit at the top lip.

According to a further feature of the invention, the part of the cap associated with the top lip and the part associated with the bottom lip are separated from one another by a continuous weakened portion.

In the region of the bottom lip the cap may be provided with notches, recesses or the like so arranged that the cap lift-off sector extends over a range of more than 180°, thus enabling the closure to be re-used in a simple manner.

According to a further proposal of the invention, a continuous expansion step is provided on the cap part extending over the mouth opening, said step facilitating the opening of the cap for both closure steps and giving better sealing of the insert against the mouth.

Since it is quite impossible in the manufacture of bottle caps and mouths to achieve an accuracy of ±0 tolerance and thus exactly divide the role played by the two closure steps, another object of the invention is to provide two closure steps, each having a different fit.

A further object of the invention is a cap having two closure steps, one with a press fit and the other with a snug fit.

Another object of the invention is a closure cap having two closure steps and a weakened portion, whereby the leverage occasioned during removal of the cap from the bottle is absorbed by the weakened portion and not transmitted to one of the closure steps.

These and other objects of the invention will be apparent from the detailed description of the invention that follows.

The top and bottom mouth lip underside used as an abutment for the cap extends at an angle of 20–40°, preferably 30°, to the horizontal axis, so that the parison is satisfactorily supported during manufacture.

The inner edge of the mouth is conical and extends at an angle of 20–50°, preferably 25°, to the vertical. This bevelling of the inner edge of the mouth results in an appreciable improvement of the filling operation of the top lip in the manufacture of the mouth, since the hot glass is pressed out into the top lip by the appropriately constructed gauge.

The closure system constructed according to the invention has considerable advantages and offers the user the possibility of re-closing the bottle when the contents have been partially emptied, this being important in the case of carbonated drinks such as beer, mineral water, etc.

The advantage for the drinks industry is that there is greater security in the closure operation, since the loosely fitted closure cap can neither shift nor drop down just before the actual closure operation, since perfect guidance and retention are ensured by the wide overlap. The means for filling the glass articles assume a satisfactory filling position on the conical inner edge of the mouth so that rapid and reliable filling are ensured.

The important advantage to the glass industry is that the mouth can be rapidly filled during manufacture, since it has a short shape of a total height of 10 millimeters and consequently the weight of glass for the new mouth is only about 50% of the normal crown cork construction. As a result of the bevelled inner edge of the mouth, the hot glass is pressed outwards into the top lip by the appropriately constructed gauge during the manufacture of the mouth so that good filling of the lip is obtained.

Several exemplary embodiments of the invention will be explained in detail with reference to the drawing, wherein:

FIG. 5 is a 120° section laid flat of a further embodiment of the invention;

FIG. 5a is a cross-sectional view of the weakened portion of the form of FIG. 5;

Figure 1:
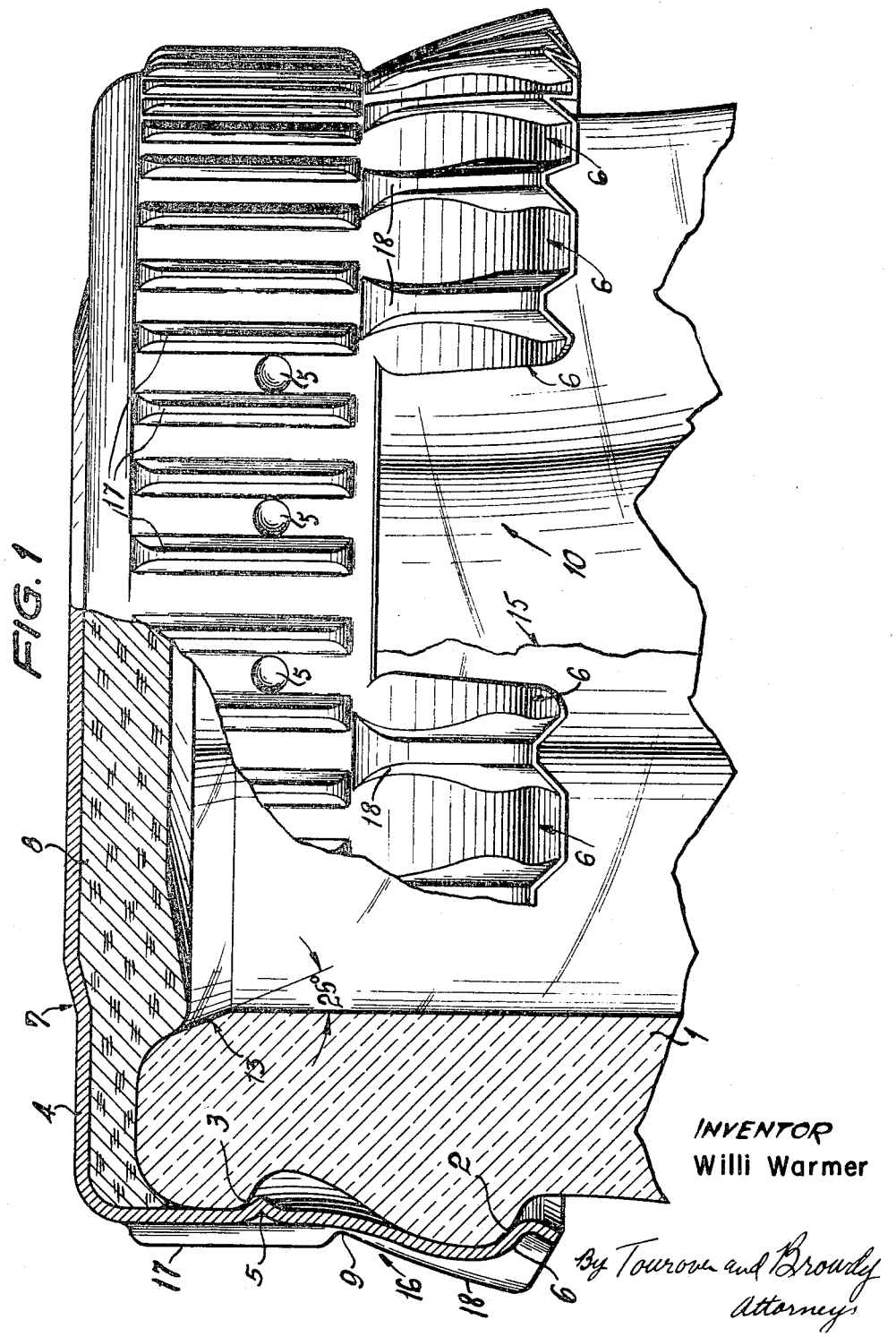
FIG. 1 shows a bottle mouth with the cap fitted in partial section.

FIGS. 8, 8a, 9, 9a, 10, and 10a are further modifications of the invention.

In the following description, the same reference numerals designate the same elements.

Reference 1 denotes the bottle mouth which has a bottom lip 2 and a top lip 3. The two lips, 2 and 3, each represent a closure step for the cap 4, which engages beneath the lips 2 and 3 at the points or areas 5 and 6. As shown in FIG. 1, the points 5 can be a series of depressions. The cap 4 so bears against the lips 2, 3 that the cap 4 is retained at the lip 2 by a press fit and at the lip 3 by a snug fit.

A continuous expansion step 7 is provided on the part of the cap 4 extending over the mouth of the bottle, and with the assistance of pressure from the thumb gives better opening of the closure steps 5 and 6 and better sealing at the mouth. An insert 8, for example a cork, is provided between the cap 4 and the mouth 1.

The rear wall of the bottle mouth 1 is broken away at 15.

The parts of the cap 4 respectively associated with the top lip 3 and the bottom lip 2 are separated from one another by a continuous weakened portion 9 which facilitates opening. In the region of the bottom lip 2 the cap is provided with cut-outs 10 which are preferably offset by 120° to one another, see FIG. 2, so that when a key 11 is applied a lift-off sector 12 (shown in cross-hatching) is obtained, which constitutes an angle of more than 180°.

The skirt 16 of the cap 4 is provided with two series of vertical, spaced profiles 17 and 18, separated by the weakened portion 9.

Figure 2:
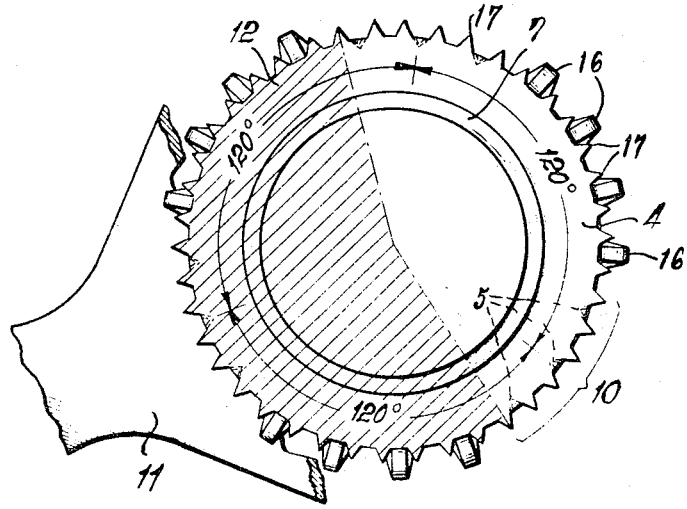
FIG. 2 is a plan view of the bottle mouth with the closure cap according to FIG. 1.

There are as many series of depressions 5 as there are cut-outs 10, each series being located above a cut-out. Thus, in this embodiment, the engagement areas 5 and 6 constitute two separate and non-aligned series of sectors. In this sense, the sectional portion of FIG. 1 is schematic. If there are three cut-outs, as indicated in FIG. 2, there will be a corresponding series of three sectors of areas 5 and an alternating series of three sectors of areas 6.

The undersides of the lips 2 and 3 serving as an abutment for the cap 4 extend preferably at an angle of 30° to the horizontal axis, so that the parison is supported more satisfactorily during manufacture. The inner edge 13 of the mouth is conical and preferably extends at an angle of 25° to the vertical so that when the mouth is manufactured the hot glass is pressed into the lip 3 by the use of an appropriately constructed gauge so that the mouth is satisfactorily constructed.

Figure 4:
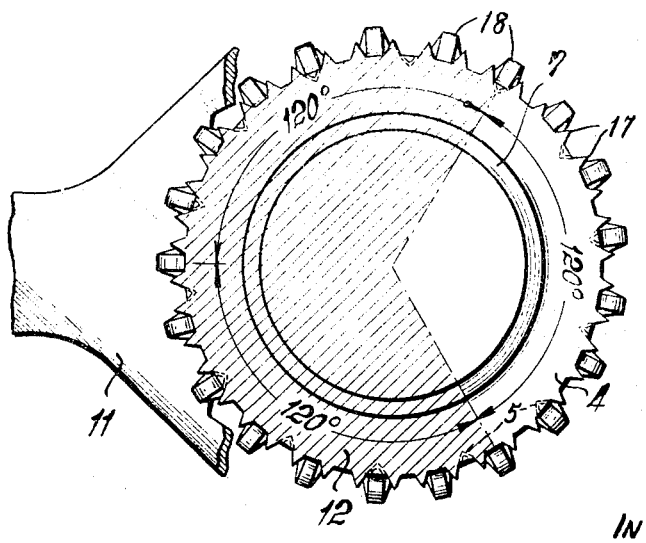
FIG. 4 is a plan view of the bottle mouth with the closure cap according to FIG. 3.
Figure 3:
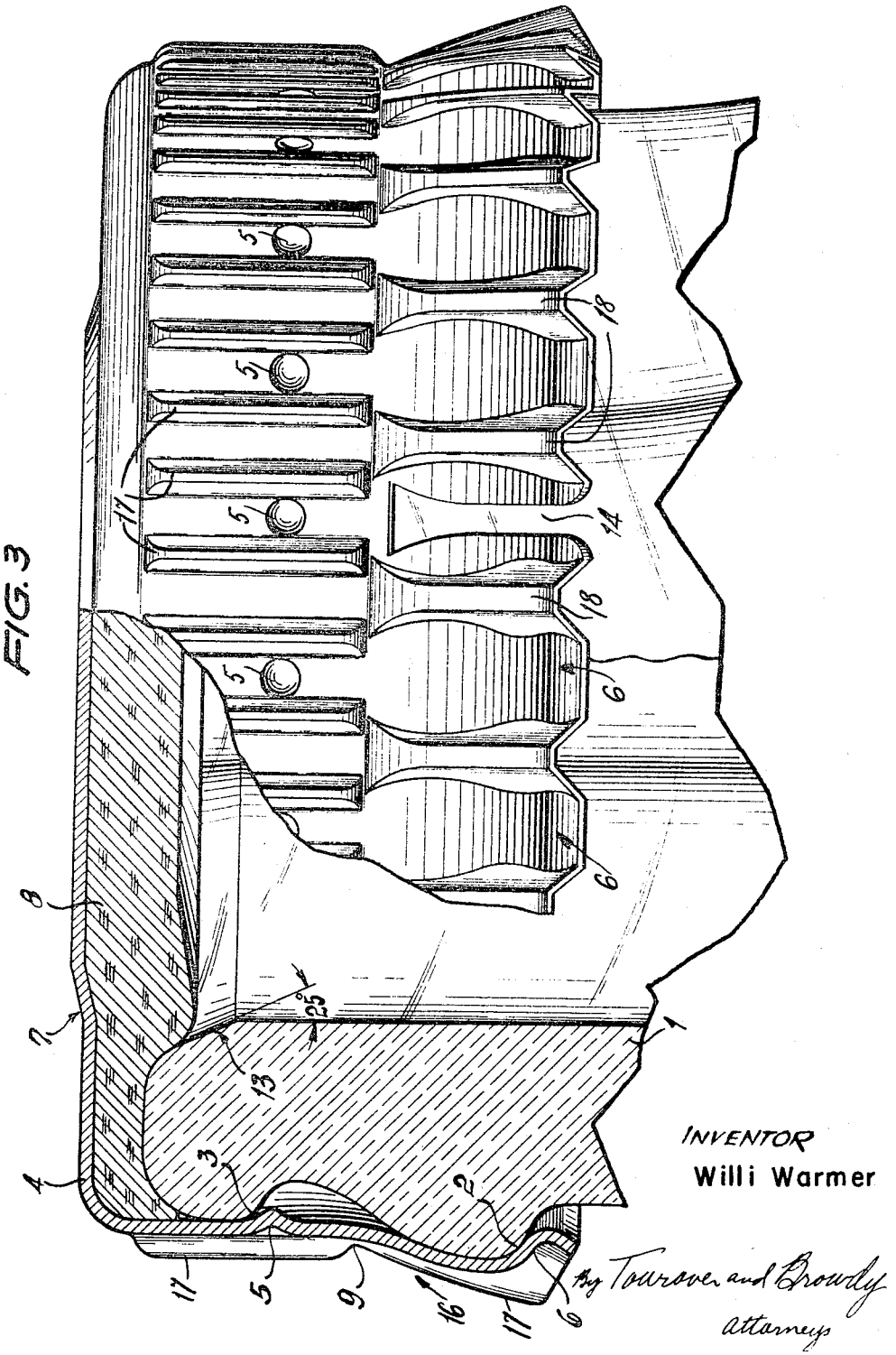
FIG. 3 is a bottle mouth with another embodiment of a closure cap in partial section.

In the embodiment of the cap shown in FIGS. 3 and 4, openings 14 are provided in the bottom part of the closure cap 3 instead of the cut-outs 10. The series of depressions 5 continue all of the way around the skirt 16. As in the previous embodiment, a press fit and a snug fit are provided at lips 2 and 3, respectively.

Referring now to FIGS. 5, 5a, 6 and 7, a further embodiment of the invention has a series of three equi-angularly spaced cut-outs 19, each cut-out having two rectangular incisions 20, as can be seen in FIG. 5, which shows a 120° section of the cap 21 stretched out flat. A weakened portion consisting of a series of depressions, as clearly seen in FIG. 5a, is referenced 22, and serves the same purpose as will be later explained, as does the weakened portion of the preceding embodiments.

The cap is also provided with an upper series of three groups of equi-angularly spaced outwardly extending profiles 23 and an alternating lower series of three groups of equi-angularly spaced outwardly extending profiles 24. In the specific form shown, the upper groups comprise four spaced profiles each, and the lower groups five each.

Figure 6:
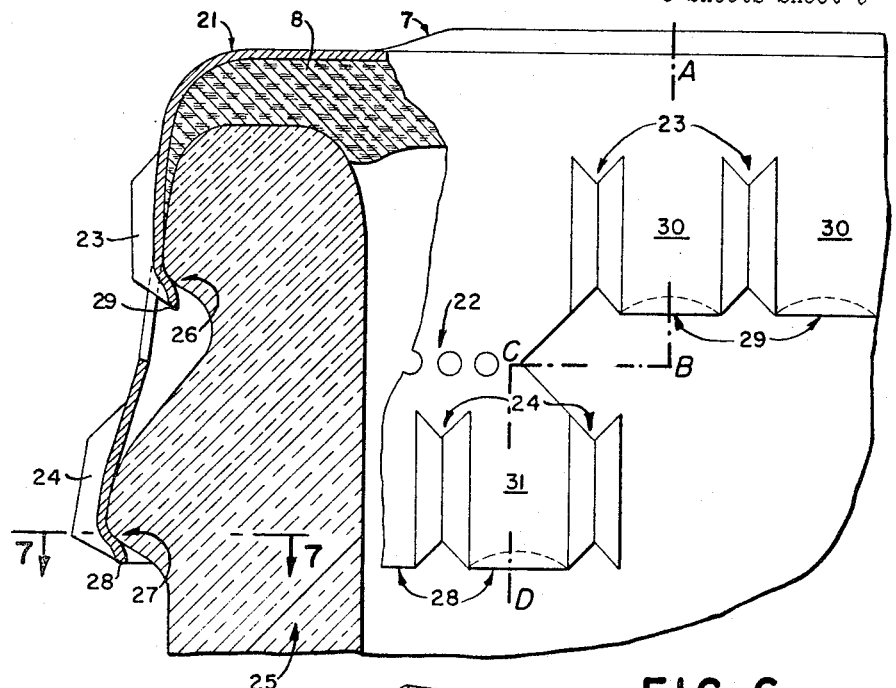
FIG. 6 shows the cap of FIG. 5 as applied to the mouth of a bottle.

FIG. 6 shows the cap 21 of FIG. 5 as applied to a bottle mouth 25 having upper and lower lips 26 and 27, respectively. The portion of the figure that is in cross-section is taken along line ABCD of the figure.

Figure 7:
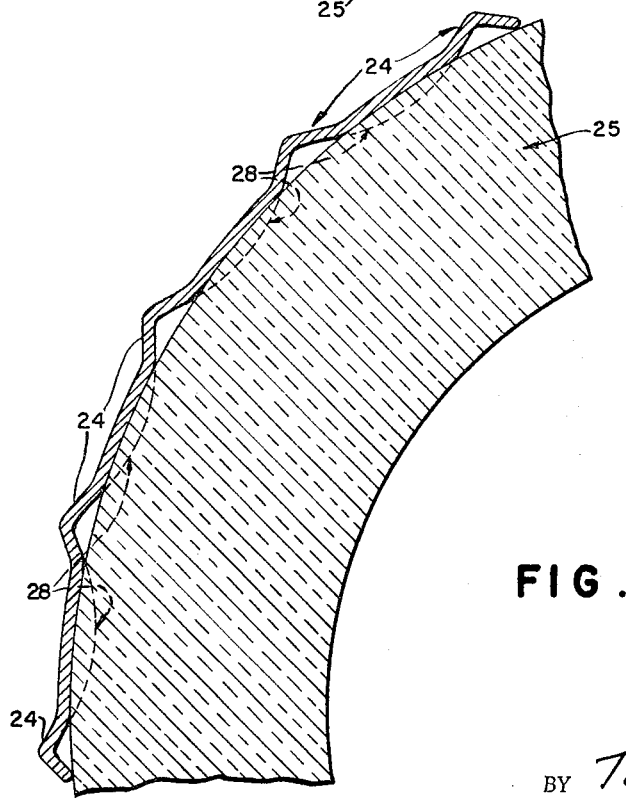
FIG. 7 is a cross-section taken on line 7—7 of FIG. 6.

FIG. 7 shows in dotted line that the lower edge 28 curves inwardly to underhang the lower lip 27 between successive profiles 24. The same is true of edge 29.

The surfaces 30 located between successive profiles 23 provide a snug fit with the lip of the bottle, while the surfaces 31 located between the profiles 24 provide a press fit with the lower lip 27.

FIGS. 8, 8a, 9, 9a, 10 and 10a illustrate further modifications of the invention.

In each of these additional forms the upper and lower profiles 23 and 24, respectively, are divided into a series of alternating groups equi-angularly spaced. In FIGS. 8, 9 and 10, each of the lower groups comprise four, three, and three surfaces 31, respectively. Each form is provided with incisions 32 or 33, as the case may be, and with a weakened portion.

In FIG. 8 the weakened portion 34 takes the shape of a trough (FIG. 8a); in FIGS. 9 and 10 the weakened portions 35 and 36 are a rectangular or a round hole (FIGS. 9a and 10a), respectively, in the skirt of the cap.

In FIG. 10, the surfaces 37 are free.

It will be understood that the weakened portions of all the forms of the invention depend for their effectiveness on a weakening of the material of the cap over their extent.

Referring to FIG. 1 (although the following explanation holds true for all forms of the invention), upon opening a bottle employing the cap of the invention, the engagement 6, which is a press fit, and the principal closure of the cap, is first loosened or broken from its engagement with the lip 2, followed by the engagement 5. The engagement of cap area 5 with bottle area 3 comes primarily into play when the cap is used to reclose or recap the bottle. In other words, when the cap is being removed from the bottle and the lower closure step or press fit 6 is being lifted up, the lever action that is naturally associated with the removal of the cap is absorbed in the weakened portion and not transmitted to the upper closure step or snug fit 5; thus the step suffers no physical distortion during removal of the cap; and when the cap is put back on the bottle, the upper closure step serves to provide a secure closure.

It will be understood that the expansion profiles of all of the forms of the invention depend for their effectiveness on a weakening of the material of the cap over their extent.

It will be further understood that in the embodiments of FIGS. 5, 8, 9 and 10, the expansion profile of one form may be substituted for that of another form. Thus, the rectangular opening of the form of FIG. 9 can be substituted for the indentations of the form of FIG. 5, etc.

The lift-off sector of all the embodiments of the invention is always greater than 180°, which considerably facilitates removal of the cap.

The word *bottle* as employed in the foregoing description and in the appended claims is intended to embrace not only those containers, conventionally made of glass, called *bottles* but all other containers, of whatever shape, size, or substance, having a mouth portion adapted to receive a cap of the invention.

I claim:

1. A reusable closure cap to be used with a bottle having a mouth provided with at least an upper and a lower lip which are consecutive, said upper lip having a smaller diameter than said lower lip, said cap including: a depending skirt, a first portion of which engages said upper lip with a snug fit and a second portion of which engages said lower lip with a press fit, said second portion being subdivided by openings extending from the skirt bottom to define spaced sections each extending over a sector of an arc; and a weakened portion extending at least partially circumferentially along said skirt and located axially between said first and second portions for absorbing the leverage occasioned during removal of the cap from the bottle, such that the first portion remains at least substantially undistorted by the leverage.

2. The cap of claim 1, wherein the area of engagement of said first portion also extends along spaced sectors of an arc and wherein said first and second portions each comprise the same plurality of spaced sectors, the sectors of one portion being rotated with respect to those of the other portion, such that the sectors of one portion occupy one set of arcs and the sectors of the other portion another set of arcs.

3. A reusable closure cap to be used with a bottle having a mouth provided with at least an upper and a lower lip which are consecutive, said upper lip having a smaller diameter than the said lower lip, said cap including: a depending skirt, a first portion of which engages said upper lip with a snug fit and a second portion of which engages said lower lip with a press fit, said second portion being subdivided by openings extending from the skirt bottom to define spaced sections, said engagements of said first and second portions being along sectors of an arc, said first and second portions each comprising the same plurality of spaced sectors, sectors of one portion being rotated with respect to those of the other portion such that the sectors of one portion occupy one set of arcs and the sectors of another portion, another set of arcs; further including a weakened portion, associated with the skirt, for absorbing the leverage occasioned during removal of the cap from the bottle, such that the first portion remains at least substantially undistorted by the leverage.

4. A reusable closure cap to be used with a bottle having a mouth provided with at least an upper and a lower lip which are consecutive, said upper lip having a smaller diameter than said lower lip, said cap including: a depending skirt, a first portion of which engages said upper lip with a snug fit and a second portion of which engages said lower lip with a press fit, wherein said first and second portions each comprise the same plurality of spaced sectors, the sectors of one portion being rotated with respect to those of the other portion, such that the sectors of one portion occupy one set of arcs and the sectors of another portion another set of arcs, and a weakened portion, associated with said skirt, for absorbing the leverage occasioned during removal of the cap from the bottle, such that the first portion remains at least substantially undistorted by the leverage, said weakened portion comprising a series of indentations in the skirt aligned with, and located above, the sectors of said second portion.

5. A reusable closure cap to be used with a bottle having a mouth provided with at least an upper and a lower lip which are consecutive, said upper lip having a smaller diameter than said lower lip, said cap including: a depending skirt, a first portion of which engages said upper lip with a snug fit and a second portion of which engages said lower lip with a press fit, wherein said first and second portions each comprise the same plurality of spaced sectors, the sectors of one portion being rotated with respect to those of the other portion, such that the sectors of one portion occupy one set of arcs and the sectors of another portion another set of arcs, and a weakened portion, associated with said skirt, for absorbing the leverage occasioned during removal of cap from bottle, such that the first portion remains at least substantially undistorted by the leverage, said weakened portion comprising a plurality of horizontal troughs in said skirt aligned with, and located above, the sectors of said second portion.

6. A reusable closure cap to be used with a bottle having a mouth provided with at least an upper and a lower lip which are consecutive, said upper lip having a smaller diameter than said lower lip, said cap including: a depending skirt, a first portion of which engages said lower lip with a snug fit and a second portion of which engages said lower lip with a press fit, wherein said first and second portions each comprise the same plurality of spaced sectors, the sectors of one portion being rotated with respect to those of the other portion, such that the sectors of one portion occupy one set of arcs and the sectors of another portion another set of arcs, and a weakened portion, associated with said skirt, for absorbing the leverage occasioned during removal of the cap from the bottle, such that the first portion remains at least substantially undistorted by the leverage, said weakened portion comprising a plurality of horizontal rectangular openings in said skirt aligned with, and located above, the sectors of said second portion.

7. A reusable closure cap to be used with a bottle having a mouth provided with at least an upper and a lower lip which are consecutive, said upper lip having a smaller diameter than said lower lip, said cap including: a depending skirt, a first portion of which engages said upper lip with a snug fit and a second portion of which engages said lower lip with a press fit, wherein said first and second portions each comprise the same plurality of spaced sectors, the sectors of one portion being rotated with respect to those of the other portion, such that the sectors of one portion occupy one set of arcs and the sectors of another portion another set of arcs, and a weakened portion, associated with said skirt, for absorbing the leverage occasioned during removal of the cap from the bottle, such that the first portion remains at least substantially undistorted by the leverage, said weakened portion comprising a plurality of holes in said skirt aligned with, and located above, the sectors of said second portion.

8. A reusable closure cap to be used with a bottle having a mouth provided with at least an upper and a lower lip which are consecutive, said upper lip having a smaller diameter than said lower lip, said cap including: a depending skirt, a first portion of which engages said upper lip and a second portion of which engages said lower lip, said second portion being subdivided by openings extending from the skirt bottom to define spaced sections, the fit between said second portion and said lower lip being tighter than that between said first portion and said upper lip; and a weakened portion, associated with said skirt, and located generally between said first and second portions for absorbing the leverage occasioned during removal of the cap from the bottle, such that the first portion remains at least substantially undistorted by the leverage.

9. A reusable closure cap to be used with a bottle having a mouth provided with at least an upper and a lower lip which are consecutive, said upper lip having a smaller diameter than said lower lip, said cap including: a depending skirt, a first portion of which engages said upper lip with a snug fit and a second portion of which engages said lower lip with a press fit, said first and second portions each comprising the same plurality of spaced sectors, the sectors of one portion being rotated with respect to those of the other portion such that the sectors of one portion occupy one set of arcs and the sectors of the other portion another set of arcs; said cap further including a plurality of openings in said skirt aligned with, and located below, the sectors of said first portion and extending to the bottom of the skirt.

10. The cap of claim 3, wherein said weakened portion is a groove.

11. The cap of claim 3, wherein said weakened portion lies at least above the sectors of said second portion.

12. The cap of claim 9, including a weakened portion, associated with the skirt, for absorbing the leverage occasioned during removal of the cap from the bottle, such that the first portion remains at least substantially undistorted by the leverage.

13. The cap of claim 12, wherein said weakened portion is a groove.

14. The cap of claim 12, wherein said weakened portion is a series of indentations in the skirt aligned with, and located above, the sectors of said second portion.

15. The cap of claim 12, wherein said weakened portion is a plurality of horizontal troughs in the skirt aligned with, and located above, the sectors of said second portion.

16. The cap of claim 12, wherein said weakened portion is a plurality of horizontal rectangular openings in the skirt aligned with, and located above, the sectors of said second portion.

17. The cap of claim 12, wherein said weakened portion is a plurality of holes in the skirt aligned with, and located above, the sectors of said second portion.

18. The cap of claim 12, wherein said weakened portion lies at least above the sectors of said second portion.

19. The cap of claim 9, wherein said openings extend at least substantially from the end of one sector of the second portion to the beginning of the next sector of the second portion.

20. The cap of claim 1, defining a top portion for covering the mouth of the bottle, and a continuous expansion step associated with said top portion.

References Cited by the Examiner

UNITED STATES PATENTS

| | | | |
|---|---|---|---|
| 734,561 | 7/1903 | Jones | 215—39 |
| 928,872 | 7/1909 | Lyon | 215—39 |
| 1,290,655 | 1/1919 | Popp | 215—39 |
| 1,941,712 | 1/1934 | Ohta | 215—39 |
| 3,136,439 | 6/1964 | Kuehn | 215—39 |

JOSEPH R. LECLAIR, *Primary Examiner.*

D. F. NORTON, *Assistant Examiner.*